Aug. 8, 1972   J. F. JUMER   3,682,799
FABRICATING AND ELECTROPOLISHING INTERIORS OF
CYLINDRICAL VESSELS WITH DOMED ENDS
Filed Jan. 29, 1971
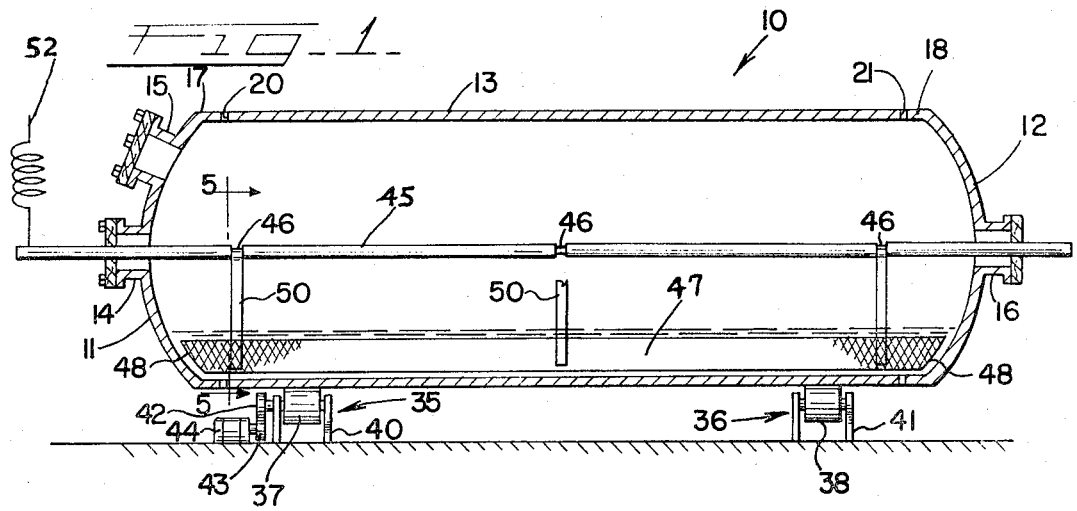
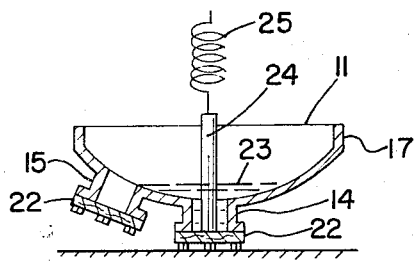
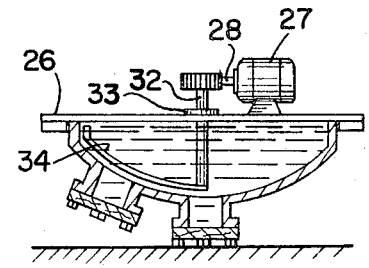
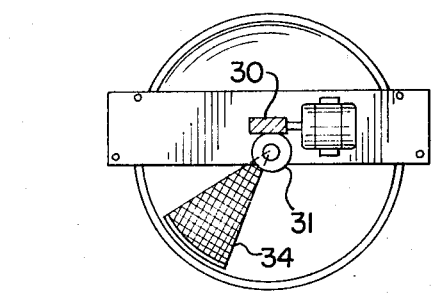
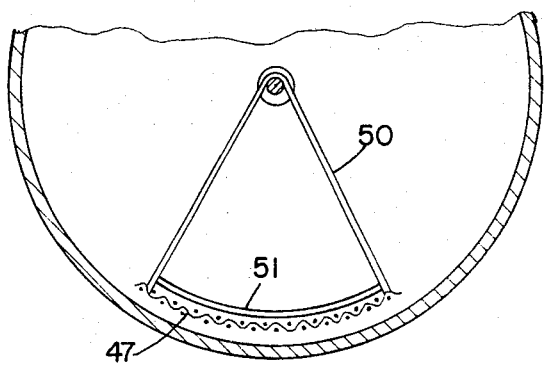
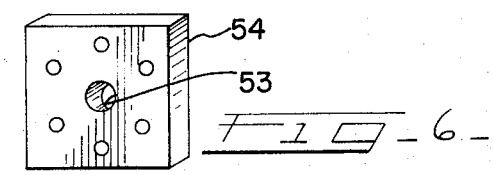
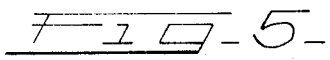
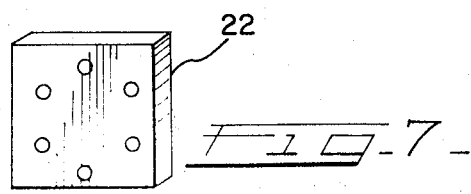
INVENTOR
JOHN F. JUMER United States Patent Office 3,682,799
Patented Aug. 8, 1972

3,682,799
FABRICATING AND ELECTROPOLISHING INTERIORS OF CYLINDRICAL VESSELS WITH DOMED ENDS
John F. Jumer, 16 W. 131 Timber Trails Drive, Elmhurst, Ill. 60126
Filed Jan. 29, 1971, Ser. No. 111,046
Int. Cl. C23b 3/06; B01k 3/04
U.S. Cl. 204—129.35                                  4 Claims

ABSTRACT OF THE DISCLOSURE

A method of fabricating cylindrical vessels having domed or necked ends, with each end having at least a protruding center access port or nozzle, and providing the interior surfaces of the vessel including the access ports or nozzles with electropolished surfaces. The interior surfaces of the domed ends, including the access ports or nozzles thereon, are first polished and then assembled by welding to the opposite ends of the main cylindrical body. The welds are usually ground smooth on the interior and then a pendant cathode immersed in a shallow bath of electropolishing solution serves to polish the inner surface of the cylindrical body including the weld areas as the vessel is slowly rotated while supported in a generally horizontal position.

---

This invention relates, generally, to innovations and improvements in fabricating, and electropolishing the interior surfaces of, large cylindrical vessels with opposing domed ends each of which has at least a protruding centrally disposed access port or nozzle. The chemical, fermentation and other process industries have requirements for such relatively large cylindrical vessels with the interior surfaces highly finished by electropolishing.

The object of the present invention, generally stated, is an improved method of fabricating, and electropolishing the interior surfaces of, large elongated cylindrical vessels having opposing domed ends with each end having at least one protruding nozzle in the center of the end. A more specific object of the invention is a convenient, practical and economical method of fabricating cylindrical vessels of the type described and of providing the interior surfaces thereof, including those of the domed ends and of the protruding nozzles, with electropolished finishes.

Certain other objects will be obvious and will appear hereinafter.

For a more complete understanding of the nature and scope of the invention, reference may now be had to the following detailed description thereof taken in connection with the accompanying drawings, wherein:

FIG. 1 is a vertical longitudinal sectional view of an elongated cylindrical vessel with domed ends supported for rotation about its axis of revolution and with apparatus in place for electropolishing the inner cylindrical surface;

FIG. 2 is a vertical sectional view through one of the domed ends before being welded to the end of the cylindrical body and showing an electrode in place for electropolishing the inner surface of the protruding center access nozzle on the domed end;

FIG. 3 is a view similar to FIG. 2 showing apparatus mounted on the domed end of FIG. 2 for polishing the inner surface of the domed end and exclusive of the interiors of the access ports;

FIG. 4 is a top plan view of FIG. 3;

FIG. 5 is an enlarged fragmentary sectional view taken on line 5—5 of FIG. 1;

FIG. 6 is a perspective view of a block with center hole and used with one of the center access ports on the domed ends of the vessels shown in FIG. 1; and, FIG. 7 is a perspective view of one of the blind flanges used for closing or sealing a protruding access port in fluid tight relationship.

Referring to FIG. 1, an elongated cylindrical vessel is indicated generally at 10 having opposed domed ends 11 and 12 which are welded onto opposite ends of the main cylindrical body 13. The domed end 11 has a center protruding access port or nozzle 14 and an off-center protruding access port or nozzle 15. The domed end 12 has a center access nozzle or port 16. It will be noted that both domed ends 11 and 12 have short cylindrical rim portions 17 and 18 respectively, the edges of which are butt welded to the opposing edge ends of the cylindrical body 13 as indicated by the welds 20 and 21, respectively.

The present invention, as previously indicated, is concerned with the method of fabricating the vessel 10 and of providing it with an electropolished interior surface, including the surfaces of the protruding nozzles 14, 15 and 16. Since the domed ends 11 and 12 will have their interiors electropolished before they are assembled by welding to the main cylindrical body portion 13, the method of electropolishing the domed end 11 will be described before describing the mounting and means for electropolishing the vessel 10.

Referring to FIG. 2, the domed end 11 is shown resting on its center protruding access nozzle 14 which is closed by means of a wooden block or blind flange 22 (FIG. 7) suitably bolted in place and drawn up sufficiently tight to prevent leakage of the electropolishing bath which is indicated at 23. The off-center nozzle 15 is similarly closed with another block 22.

A cathode in the form of a cylindrical rod or tube 24 is vertically disposed so that the bottom end rests on the upper surface of the block 22 with the cathode being centrally placed within the bore of the nozzle 14. If desired, insulating supports (not shown) may be attached to the cathode 24 to maintain it in its centered and upright position. Electropolishing current is supplied to the cathode 24 through the bolt heads used to retain the block 22 in place with the supporting surface will normally provide a sufficient electrical ground so that current will pass between the interior surface of the nozzle 14 and the cathode 24 for electropolishing purposes. It will be understood that the bath 24 may have any one of several known compositions.

After the interior of the nozzle 14 has been electropolished the cathode 24 will be positioned centrally in the nozzle 15 after the domed end 11 has been tilted so as to rest on nozzle 15 instead of on nozzle 14. The interior of the nozzle 15 is then electropolished by passing electropolishing current through the bath 23 for the appropriate time at the appropriate current density in a manner well-known to those skilled in the art.

Following the polishing of the interiors of the two nozzles 14 and 15, the cathode 24 is removed, the domed end 11 is again placed so that it rests on the protruding nozzle 14, or the domed end may be otherwise supported in an upright position, and apparatus is put in place for electropolishing the primary interior surface of the domed end. In general this apparatus conforms to that shown and described in my prior Patent 2,861,937 dated Nov. 24, 1958. Briefly, the apparatus consists of a support or mounting platform 26 which rests on the upper edge or lip of the domed end 11 and serves to support an electric motor 27 the shaft 28 of which is provided on its outer end with a worm 30 for driving a gear 31 mounted on the upper end of a vertical shaft 32 suitably supported and journaled in a bearing 33 mounted on the platform 26.

A sector-shaped or pie-shaped copper mesh cathode 34 is supported on the bottom end of the shaft 32 and is contoured to follow the curvature of the interior surface of the domed end 11 including the cylindrical rim portion 17 in uniform spaced proximity thereto.

When the platform 26 is made out of an insulating or dielectric material such as wood, an electrical conductor may be connected to the bearing 33 so as to provide an electrical connection through the bearing 33 and shaft 32 to the cathode 34. Again, the domed end 11 will be suitably grounded normally by virtue of resting on a grounded surface or support so that electropolishing current flows between the inner surface of the domed end and the cathode 34 in known manner thereby electropolishing the inner surface as the cathode sweeps thereover on rotation of the shaft 32 by the motor 27.

It will be understood that the domed end 12 has the interior surface of its nozzle 16 and the interior surface of the domed end electropolished in the same manner as described for the domed end 11 in connection with FIGS. 2–4 with the exception that there is no off-center protruding nozzle or access port corresponding to nozzle 15 to have its interior polished. After the complete interior surface of the two domed ends 11 and 12 have been electropolished, these ends are suitably butt welded to the opposing ends of the cylindrical body 13 in known manner. Thereafter the inner surfaces of the welds 20 and 21 are polished with access for the polishing operation being gained through one of the open access ports or nozzles. Known equipment and techniques may be used for such mechanical polishing operations.

For purposes of electropolishing the interior surface of the main cylindrical body 13, the completely fabricated vessel 10 is horizontally cradled for rotation about its principal or longitudinal axis by placement on spaced pairs of supporting rollers indicated generally at 35 and 36 (FIG. 1), respectively. Each set of rollers 35 and 36 consists of two separate sets of rollers 37—37 and 38—38 mounted in supporting stands 40 and 41, respectively, with the stub shafts supporting the rollers being parallel.

A pinion gear 42 is mounted on the end of the stub shaft supporting one of the rollers 37 and has meshing engagement with a pinion gear 43 carried on the drive shaft of an electric motor 44. It will be understood that when the motor 44 is energized and drives the gear 43 one roller 37 will be driven and this will be sufficient to slowly rotate the completed vessel 10.

After the vessel 10 has been mounted on the rollers a cathode assembly will be inserted into the interior of the vessel. This assembly comprises a long metallic shaft or rod 45 which may be either solid or hollow, preferably the latter. Intermediate its ends the rod or shaft 45 is provided with a plurality of grooves 46—46 (three being shown). It will be appreciated that grooves can in effect be provided by securing sets of spaced collars on the rod 45. When the shaft or rod 45 is tubular or hollow these sections 46 may be conveniently provided by short solid pins of appropriate diameter telescoped within opposing ends of the tubular or hollow sections.

In addition to the shaft or rod 45 the cathode apparatus includes an elongated copper mesh or screen 47 which may be folded, rolled, or disassembled for insertion through one of the protruding access nozzles or ports. At its extremities the wire mesh cathode 47 is provided with upturned ends 48—48 (FIG. 1) which are contoured so as to be evenly spaced from the adjacent curved surfaces of the adjacent domed ends 11 or 12.

The cathode 47 is conveniently supported in a pendant manner from the shaft or rod 45 by a plurality of inverted V-shaped supports or hangers 50—50. Each of the supports 50 is in the form of a stiff metal strap or rod with the bite curved so as to hang freely in one of the grooves or recesses 46 as shown in FIG. 5. Supported on the outer ends of each of the hangers or V-shaped supports 50 is an arcuate re-enforcing member 51 (FIG. 5) which serves to impart the proper radius of curvature to the foraminous cathode 47. The latter element is suitably attached to the outer ends of the V-shaped hangers or supports 50.

It will be seen that all of the elements of the cathode assembly may be readily inserted through one of the access ports or nozzles in domed end 11 or 12 into the completed vessel 10 and then appropriately assembled therein. After the cathode assembly is completed within the vessel 10 electropolishing solution or bath is introduced to a depth sufficient to just cover the upper parallel edges of the arcuate cathode 47 thereby minimizing the weight that has to be supported on the support rollers 37 and 38. With the rollers 37 and 38 formed of metal, and the stub shafts and mountings for the rollers being also formed of metal, adequate grounding for the rotating metallic vessel 10 is provided so that current may be passed through the solution when the cathode is appropriately connected as by connector or conductor 52 to the appropriate terminal or pole of a source of direct current. Alternatively, instead of grounding through the rollers and supports, one end of a flexible cable may be clamped to the vessel and the other end grounded to a D.C. source.

Since the V-shaped supports or hangers 50 hang loosely from the rod 46 the cathode assembly hangs down in a pendant or stationary position as the vessel 10 is rotated. The shaft 45 is suitably supported in a stationary position by passing it through central openings or holes 53 in the wooden blocks 54 (FIG. 4) which are bolted to the outer flanges of each of the protruding access ports or nozzles 14 and 16. Since the liquid or polishing bath does not have access to the interior of these ports the blocks 54 do not have to be tightly drawn up and the rod 45 does not have to have a fluid tight seal or connection as it passes through the openings 53. By not having a fluid tight seal at the ports 14 and 16 adequate venting of the vessel 10 is provided. However, the off-center access nozzle or port 15 should be closed with one of the solid blocks 22 since in its down-most position during rotation, some of the electropolishing solution will enter into this port or nozzle.

It will be understood that after the electropolishing action has been carried out sufficiently and in known manner the cathode assembly may be removed from the vessel and the electropolishing bath or solution emptied out.

I claim:

1. In the method of fabricating and electropolishing the interior surface of an elongated cylindrical vessel having secured to opposite ends of a cylindrical body generally domed ends each of which has at least a centrally positioned outwardly protruding access nozzle, the improvement which comprises the steps of individually electropolishing the interior surfaces of each of said domed ends including the interior of each of said nozzle thereon, circumferentially welding each of said interiorly polished domed ends to one end of said cylindrical body, supporting said vessel in at least approximately level position for rotation with respect to its axis of revolution, introducing a shallow electropolishing bath into said vessel, freely suspending in spaced juxtaposed relation to the interior of the bottom of said vessel an elongated cathode in the shape of a rectangular cylindrical section equal in length to the interior length of said cylindrical body and having approximately the same radius of curvature thereas, said cathode being pendantly suspended from a rod at least substantially coaxial with the axis of revolution of said vessel and with the opposite ends of said rod supported in electrically insulated relationship in said access nozzles centrally positioned on said opposing domed ends, and applying voltage between said cathode and said vessel as an anode through said electropolishing bath to produce an electropolishing action on the interior of said cylindrical body portion of said vessel as said vessel is rotated.

2. The improvement called for in claim 1 wherein each domed end includes a short cylindrical section the circumferential edge of which is butt welded to the mating circumferential edge on one end of a cylinder comprising the main portion of said cylindrical body.

3. The improvement called for in claim 2 wherein said circumferential butt welds are mechanically polished on their interiors prior to electropolishing.

4. The improvement called for in claim 1 wherein the interior surface of each of said protruding access nozzles is electropolished separately from the main interior surface of the respective domed ends.

References Cited

UNITED STATES PATENTS

| | | | |
|---|---|---|---|
| 1,076,424 | 10/1913 | Held | 204—26 |
| 1,720,354 | 7/1929 | Schwartz | 204—26 |
| 1,850,426 | 3/1932 | Tyrrell | 204—26 |
| 2,412,186 | 12/1946 | Whitehouse et al. | 204—140.5 |
| 2,665,247 | 1/1954 | Jumer | 204—140.5 |
| 2,764,540 | 9/1956 | Farin et al. | 204—140.5 |
| 2,861,937 | 11/1958 | Jumer | 204—212 |
| 3,326,785 | 6/1967 | Williams | 204—140.5 |

JOHN H. MACK, Primary Examiner

T. TUFARIELLO, Assistant Examiner

U.S. Cl. X.R.

204—129.6, 212, 284, 286